No. 764,488.

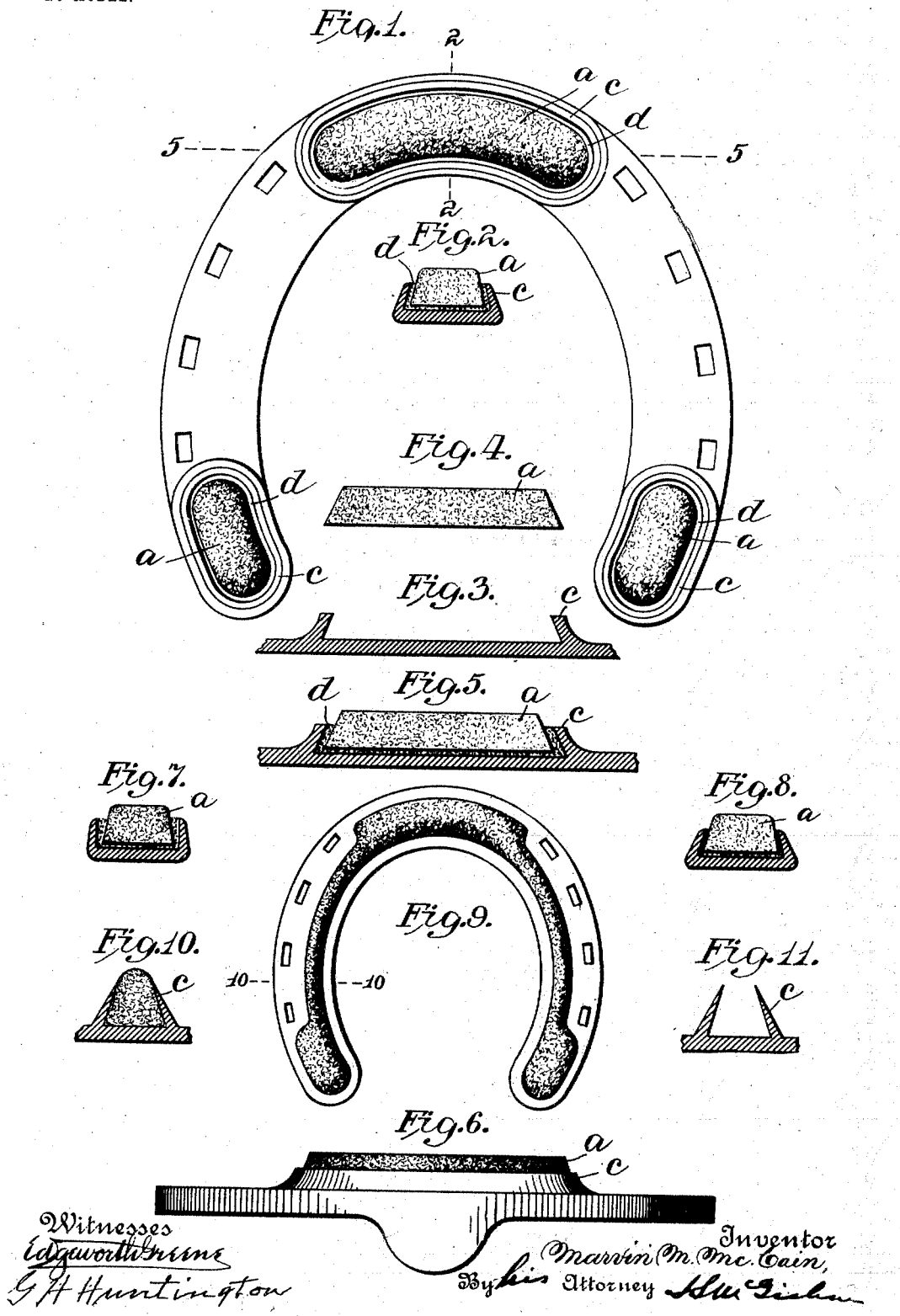

Patented July 5, 1904.

UNITED STATES PATENT OFFICE.

MARVIN M. McCAIN, OF BROOKLYN, NEW YORK, ASSIGNOR, BY MESNE ASSIGNMENTS, TO EMPIRE SAFETY TREAD COMPANY, OF BROOKLYN, NEW YORK, A CORPORATION OF THE DISTRICT OF COLUMBIA.

HORSESHOE.

SPECIFICATION forming part of Letters Patent No. 764,488, dated July 5, 1904.

Application filed January 15, 1903. Serial No. 139,106. (No model.)

*To all whom it may concern:*

Be it known that I, MARVIN M. MCCAIN, a citizen of the United States, residing in the city of Brooklyn, county of Kings, and State of New York, have invented a new and useful Improvement in Horseshoes, of which the following is a specification.

This invention relates to horseshoes, and has for its principal object to provide a horseshoe with calks or a wearing-surface composed of corundum stone that will not slip on ice or other smooth surfaces, such as wet asphalt, &c., also to increase the wear and durability of the shoe, all of which will be hereinafter explained.

In the accompanying drawings, which form a part of this specification, my invention is fully illustrated in several figures, with similar letters of reference to indicate corresponding parts, as follows:

Figure 1 represents a plan view of my improved horseshoe from the face side which rests upon the ground. Fig. 2 represents a transverse section of Fig. 1 through the line 2 2. Fig. 3 represents a section on the line 5 5, Fig. 1, before the calk is inserted. Fig. 4 represents a section of the calk before it is secured in the shoe. Fig. 5 represents a section on line 5 5, Fig. 1, with calk inserted in its place, showing the intermediate substance which holds the calk in position. Fig. 6 represents a front view of the finished shoe looking toward the toe, showing the calk protruding from the socket into which it is secured. Figs. 7 and 8 represent transverse sections to show another method of securing the calk. Fig. 9 represents a view of a complete horseshoe with a continuous stone facing; and Figs. 10 and 11 represent cross-sections on line 10 10, Fig. 9, with and without the stone filling, all of which will be hereinafter explained.

Referring to Fig. 1, a metal horseshoe is formed (usually by drop-forging) which contains the sockets to receive the calks $a$. These sockets are provided with a raised portion or combing $c$, which projects above the plane of the shoe the desired height to protect the calk.

The calk which I use and which is illustrated separately in Fig. 4 is made of corundum stone, generally formed in molds the desired size and shape, or said calk may be formed of any hard porous artificial stone.

From Figs. 2, 3, and 5 it will be seen that the sockets which receive the calks $a$ are larger at the bottom than on the top, or open, thus forming a dovetail which is utilized to hold the calk in place. It will also be seen from Figs. 2, 4, and 5 that the calk itself is much larger at the bottom than at the top and that its bevel corresponds to that of the bevel in the socket which forms the dovetail.

The largest surface of the calk (which is its under surface and the one which rests within the dovetail) is the same size as the opening of the dovetail socket of the shoe into which it is to rest. Therefore when the calk is placed within the socket it will leave a space of equal thickness surrounding the calk within the socket, as shown at $d$, Figs. 1, 2, and 5. In some cases it is best to destroy the metallic contact between the calk and the socket of the shoe as far as possible, which can only be done by surrounding the calk on all sides within the socket by a vegetable or non-metallic substance, which substance forms a shock-absorbent. One method of accomplishing this result where the shoes are light and used for carriage or rapid-gaited horses is to place a certain amount of unvulcanized rubber within the socket underneath the calk sufficient in quantity to fill the surrounding space and the space between the calk and the bottom of the shoe. A clamp is than used to press on all three calks $a$, Fig. 1, which when the rubber is hot and very soft will force the calks down and hold them into the desired position, while the hot rubber will travel in all directions to fill the intermediate space. Thus the calk when the rubber is vulcanized is left dovetailed securely within the socket by means of the intermediate rubber, this rubber being made hard or soft according to the duty required of it to hold the calk in position. The principal method, however, which I employ and which is used where the shoes are heavy for service on draft-horses is to suspend the calk in position within the socket, as illustrated in Figs. 2 and 5, leaving a space below and on all sides of the calk, and then fill the intermediate space with hot lead or solder or a soft Babbitt metal. When this is done, however, I usually have the shoes quite hot, so that the socket is expanded to its largest size. Thus when the shoe is cooled the socket will contract on the lead and hold it more firmly.

It is not necessary that the calk should project far above the combing $c$ or socket, as the metal forming the sockets will wear so much faster than the corundum stone which forms the calk that the stone calk is always projecting sufficiently far to perform the service required of it.

Another method of securing the calk in position is illustrated in Figs. 7 and 8. In this case the socket in the shoe which is to receive the calk has its sides made perfectly straight, as shown in Fig. 7. The calk, however, is dovetailed in the usual form and is sufficiently small to permit of a piece of rubber or other tough non-metallic substance, as described, being inserted between the calk and socket. The calk is then forced into position and the sides of the socket bent over upon the dovetailed portion of the calk, as shown in Fig. 8.

It may be advisable on some occasions to extend the calks entirely around the shoe, as shown in Fig. 9, in order to get the greater wearing service, in which case the same methods of securing the stone in position as that above described would be employed, except where it is desirable to provide a calk that is high and sharp, as shown in Fig. 10. The method then employed is to provide the shoe with sockets which have high combings $c$, Figs. 10 and 11, tapering to a sharp edge, the socket thus provided being filled with the corundum stone while in its plastic condition and left to cool and harden, the iron shoe contracting upon the calk as it cools and providing practically one solid structure. The corundum stone thus forming the surface which comes in contact with the ground will never slip and will wear for a long period of time.

Having thus described my invention, what I claim, and desire to secure by Letters Patent of the United States, is—

1. A horseshoe the body portion of which is provided with dovetailed sockets, removable dovetailed calks arranged in said sockets and conforming to the shape thereof but of less size than that of the sockets, whereby a space is provided at all points between the calks and the body of the shoe, and shock-absorbing material enveloping the portions of the calks within the sockets to prevent contact of the calks with the body of the shoe.

2. A metal horseshoe provided with dovetailed sockets on its wearing side, suitable non-slipping calks formed to fit within the said sockets, leaving a space between the said calk and socket, with a hardening plastic substance filling the said space to retain the said calk firmly in position, substantially as set forth.

3. A horseshoe the body portion of which is provided with dovetailed sockets, combings arranged around said sockets and projecting beyond the plane of the shoe, removable dovetailed calks arranged in said sockets and formed of a hard porous substance, the size of said calks being less than the size of the sockets, whereby a space is provided at all points between the calks and the body of the shoe, and a packing arranged in said space and enveloping the entire portion of the calks within the sockets to provide a shock-absorbent therefor and prevent contact of the calks with the body of the shoe.

In testimony that I claim the foregoing specification I have hereunto set my hand this 12th day of January, 1903.

MARVIN M. McCAIN.

In presence of—
E. G. DUVALL,
G. H. HUNTINGTON.